Aug. 9, 1927.
E. C. FRITTS
1,638,569
MOTION PICTURE PROJECTOR
Filed Feb. 20, 1925   3 Sheets-Sheet 1
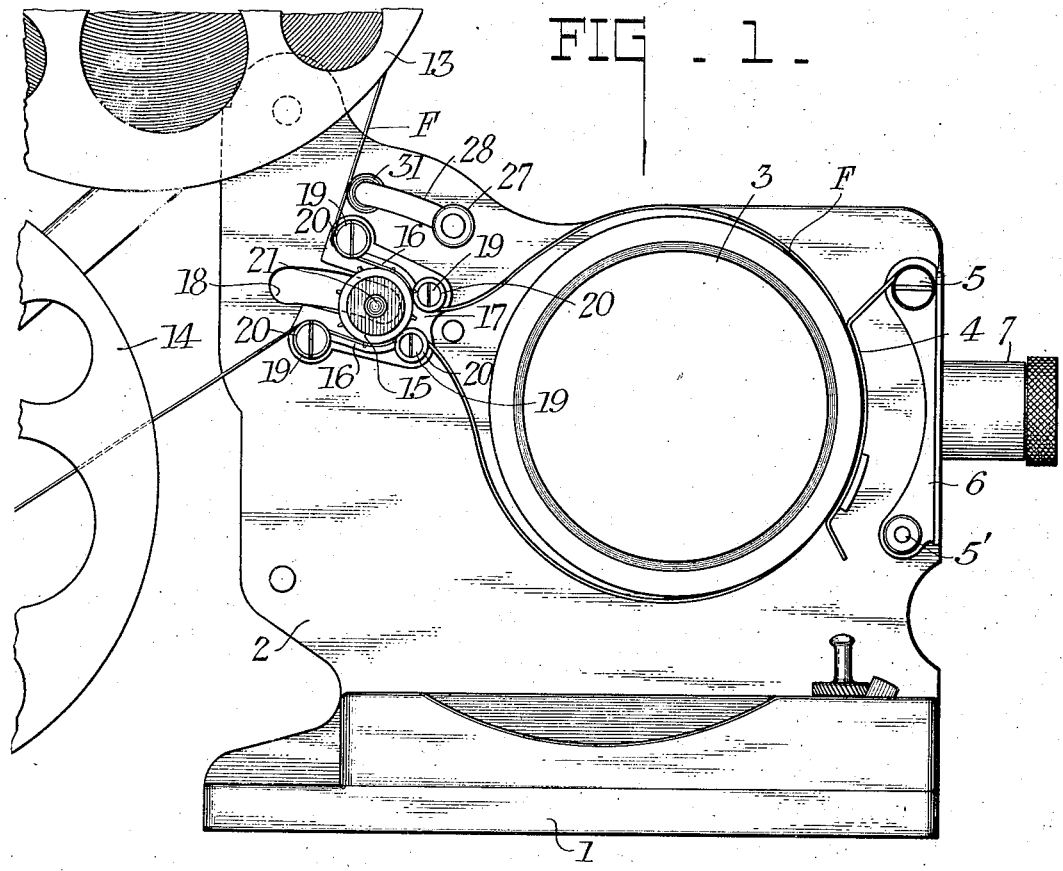
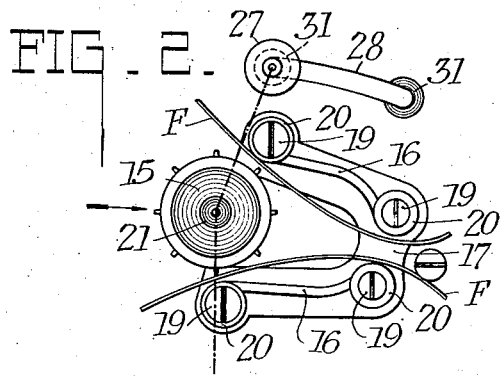
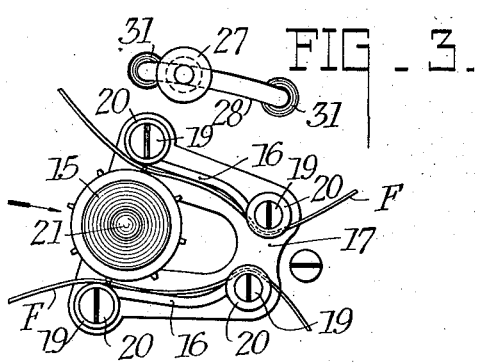
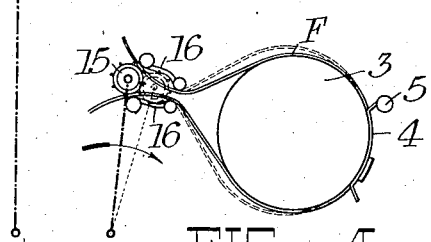
INVENTOR.
Edwin C. Fritts,
BY P. L. Stinchfield
N. M. Perrins
ATTORNEYS.

Aug. 9, 1927.
E. C. FRITTS
1,638,569
MOTION PICTURE PROJECTOR
Filed Feb. 20, 1925
3 Sheets-Sheet 2
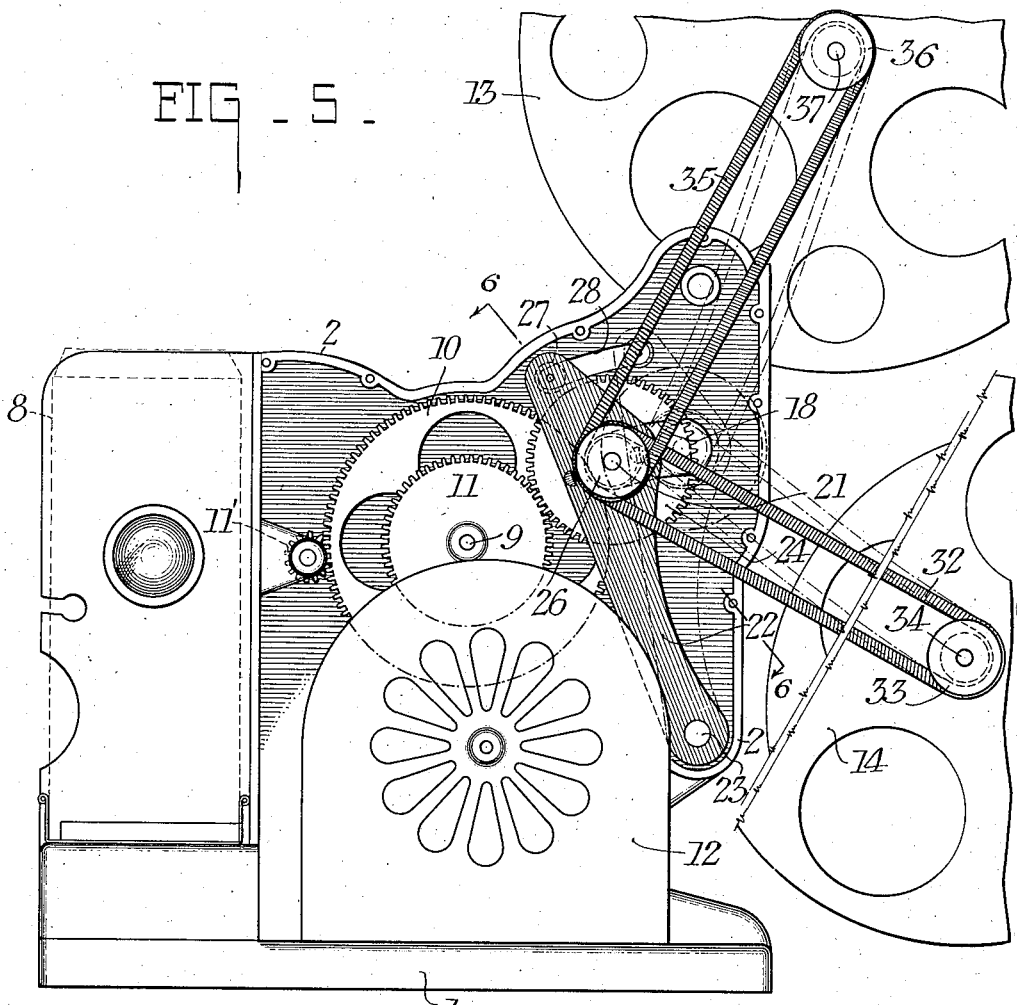
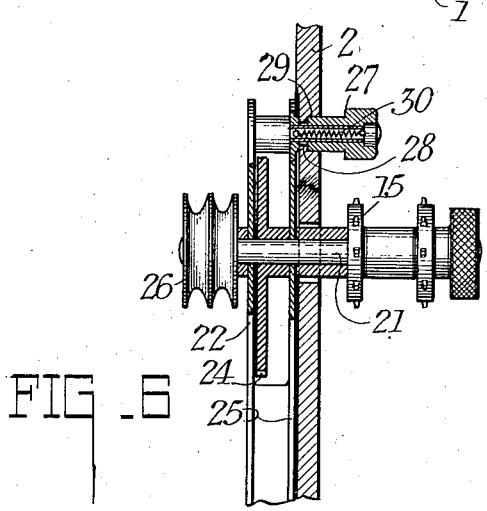
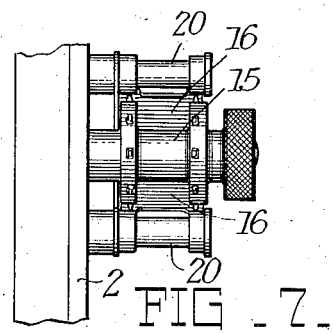
INVENTOR.
Edwin C. Fritts,
BY
ATTORNEYS.

Aug. 9, 1927.
E. C. FRITTS
1,638,569
MOTION PICTURE PROJECTOR
Filed Feb. 20, 1925
3 Sheets-Sheet 3
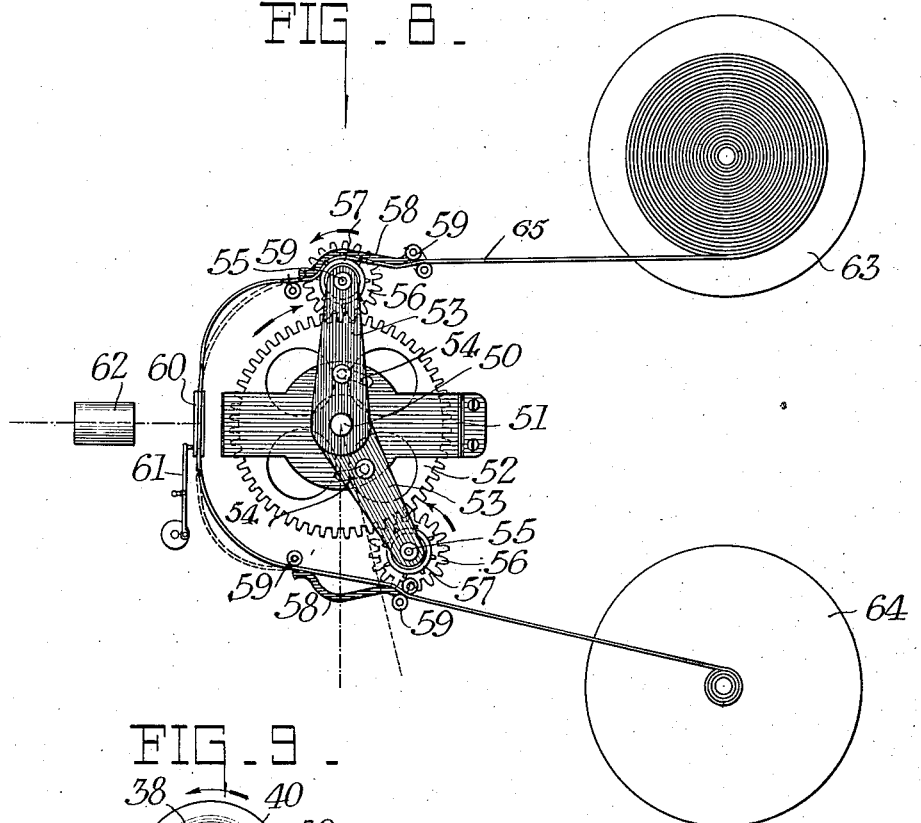
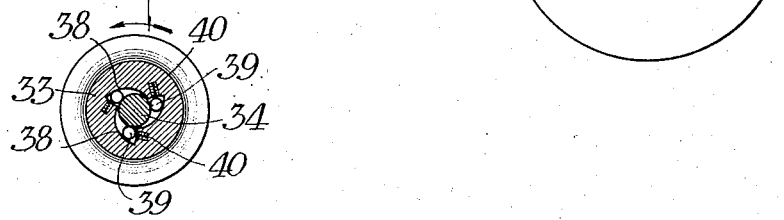
INVENTOR.
Edwin C. Fritts,
BY
ATTORNEYS.

Patented Aug. 9, 1927.

1,638,569

UNITED STATES PATENT OFFICE.

EDWIN C. FRITTS, OF ROCHESTER, NEW YORK, ASSIGNOR TO EASTMAN KODAK COMPANY, OF ROCHESTER, NEW YORK, A CORPORATION OF NEW YORK.

MOTION-PICTURE PROJECTOR.

Application filed February 20, 1925. Serial No. 10,599.

This invention relates to motion picture projectors and more particularly to improvements especially applicable to a projector of the type shown in the application of John G. Capstaff, Serial No. 10,601 filed Feb. 20, 1925, and intended principally for home use by unskilled operators.

It is customary in motion picture projectors to thread the film between sprockets fixed in position and presser members that are movable to and from the sprockets. In such threading it is necessary to take care that the sprocket teeth enter the perforations of the film and that loops are formed in the film so as to provide slack above and below the intermittent take up mechanism.

The object of my invention is to provide a mechanism that will perform this threading and looping automatically, that is, the film perforations will be properly seated on the sprocket teeth and loops of the proper size will be formed without particular attention being paid to these details.

I accomplish this and other objects by means of the structure hereinafter disclosed and particularly by mounting the sprocket so that it can be bodily moved into position between the fixed film guides, whereupon the sprocket teeth will engage the perforations and push the film ahead of it, thus performing the operations mentioned.

Reference will now be made to the accompanying drawings in which the same reference characters denote the same parts throughout and in which Fig. 1 is a side elevation of my improved projector, parts of the reels being broken away.

Figs. 2 and 3 show the sprocket, guides and film with the sprocket in retracted and operative positions respectively, Fig. 4 is a diagram showing the formation of the film loops.

Fig. 5 is an elevation from the side opposite to that shown in Fig. 1.

Fig. 6 is a fragmentary section on line 6—6 of Fig. 5.

Fig. 7 is a fragmentary end view showing the sprocket and guides in operative relation.

Fig. 8 is a side view, partly diagrammatic, of a modification.

Fig. 9 is a section of a pulley used with the film reel.

Upon a base 1 is supported a longitudinal frame or partition 2 upon one side of which is a cylindrical casing 3 containing the pull down mechanism, not shown, adapted to draw a film F intermittently through the gate, that is, between the convex surface of the casing 3 and the cooperating concave surface of a presser member 4 mounted to swing on pivot 5 and resiliently pressed toward the casing. Mounted on the same pivot 5 is a frame 6 carrying the objective mount 7 and held in place by a catch 5'.

On the other side of the partition 2 is a lamp house 8 from which light is directed by a suitable optical system upon the film at the gate. The pulldown mechanism is operated from a shaft 9 extending through the partition and carrying gears 10 and 11, one of which 10 engages a pinion 11' to operate a safety shutter as described in said Capstaff application. It is driven by suitable connections from a motor in casing 12. The above general arrangement is mentioned in order to show a typical structure to which my invention is adapted but of which a more detailed description is unnecessary to an understanding of my invention.

The film F is fed in a loop around the casing 3 from a supply reel 13 to a take up reel 14 by means of a single sprocket wheel 15 against which the film is held by fixed bowed guide members 16. These are formed on a supporting plate 17 and held on the partition 2 by bolts 19, which also support rollers 20. Sprocket 15 is fixed to a stub shaft 21 which passes through an arcuate slot 18 in partition 2 and is journaled in the frame 22, this frame being pivoted at 23 to the rear of partition 2. Upon shaft 21 are fixed a gear 24 lying between the plates 25 of frame 22 and a pulley 26 in the rear thereof. At the upper end of frame 22 is a hollow stud 27 extending through an arcuate slot 28 in partition 2, and carrying a head or button 29 slidable thereon and drawn toward the partition by spring 30. At each end of slot 28 is a seat 31 in which this head seats but from which it may be readily withdrawn against the action of the spring. This furnishes means for positioning the frame with the shaft 21 at either end of slot 18. When at the forward end of the slot nearer the casing 3, the gear 24 meshes with gear 11 and the sprocket 15 is thereby turned to advance the film.

The spring belt 32 passes around one pulley 26 and pulley 33 on the shaft 34 of the take up reel 14. Another spring belt 35 passes around the other pulley 26 and pulley 36 on the shaft 37 of the supply reel 13.

Each of the pulleys 33 and 36 is connected to its respective shaft by a one way clutch of any familiar type. As shown in Fig. 9, the pulley 33 has camming recesses 38 with rollers 39 therein, there being very light springs 40 to insure that the rollers will engage shaft 34 when the pulley is turned in one direction. When turned in the other direction the clamping action will be released. This is a familiar type of clutch.

The motor is reversible so that it will turn the mechanism in either direction, that the film may be passed in either direction through the machine, permitting portions to be reversed and reprojected as desired. The one way clutches are so designed that the reel from which the film is being wound will run free and the other reel will be driven.

The film is threaded from the sprocket to the upper side of the upper reel 13 and the lower side of the lower reel 14. Referring to Fig. 5, when the sprocket is turning in a counter clockwise direction, the pulleys will be turning in the same direction; the lower pulley only having a driving connection with its shaft; and the upper reel running free; while when the pulleys and sprocket turn in a clockwise direction the lower reel runs freely and the upper one is driven.

When the frame 22 and sprocket 15 are in their operative, normal or forward position, shown in full lines in Fig. 5, there is a tension exerted on the belts sufficient to drive whichever reel is operatively connected but permitting the necessary slip. When however, the frame and sprocket are in their inoperative or rearward position, indicated in dotted lines, the tension on the belt is so relaxed that it has no driving force and the film can then be wound directly from one reel to the other without the belt acting as a brake or interfering with such rewinding.

When film is to be threaded into the machine, the frame and sprocket are placed in the rearward position, the full reel is usually placed on the upper support, the end of the film is attached to the lower reel and sufficient film drawn out to form a coil that is positioned around the casing 3 and under the presser member 4 and between the sprocket 15 and the guides 16, in the position shown in Fig. 2. The frame and sprocket are then moved forward, the teeth of the sprocket sliding along the film until they engage perforations therein, whereupon the sprocket pushes the film ahead of it forming additional slack in the loop and thus insuring that there will be sufficient slack on each side of the intermittent pull-down mechanism for the apparatus to function properly. Fig. 3 shows the parts just as the teeth engage the perforations, and Fig. 4 shows the two positions of the parts in full and dotted lines respectively.

It will thus be seen that this apparatus is very accessible and easy to thread, insures the engagement of the sprocket teeth with the perforations, automatically forms the necessary film loops, removes driving tension from the belts, disconnects the sprocket from driving relation with the motor, and is, moreover, of simple design and economical to manufacture.

Another embodiment of my invention is shown in Fig. 8. Only the elements essential to an understanding of the invention are illustrated. A main shaft 50 is journaled in a fixed support 51 and carries the large gear 52. Mounted to swing freely about shaft 50 are the two frames 53, the movement of each being limited by the pin and slot connection 54 with the support 51. Each frame 53 has journaled near its outer end a stub shaft 55 carrying a gear 56 meshing with gear 52 and a sprocket wheel 57. Fixed bowed film guides 58 and guide rollers 59 are positioned substantially in the positions indicated. A film gate 60, pull-down mechanism 61, objective mount 62 and supply and take up reels 63 and 64 are conventionally shown in their positions relative to the other parts. In operation the frames and sprockets are retracted to inoperative position, the film 65 formed into a loop between the reels and positioned with respect to the guides and gate, and the frames and sprockets then moved to operative position. In this movement, the sprockets will be positively turned through the engagement of the gears and will engage and feed the film sufficient to form ample loops above and below the gates. In Fig. 8 the lower sprocket is shown in inoperative position and the corresponding part of the film is shown as it would be positioned by the operator. When the frame and sprocket are moved, a sprocket tooth will engage a perforation and push it ahead through about the angle indicated between the dotted lines, and forming the lower loop indicated in dotted lines. The upper sprocket is shown in operative position with the film in final position, the original position of the film loop being in dotted lines.

It is to be understood that throughout the drawings, details and parts not necessary to an understanding of my invention have been omitted.

It is to be understood that the above described structures are by way of example and that I contemplate as within the scope of my invention all such modifications and equivalents as are properly covered by the appended claims.

Having thus described my invention, what I claim as new and desire to secure by Letters Patent is:

1. In motion picture apparatus, an exposure window, a film guide at a distance from the window, a sprocket movable toward and from said guide at an acute angle thereto and thereby adapted when moved toward said guide to engage a film threaded past said window and guide and to move said film to form a loop therein between the window and guide.

2. In motion picture apparatus, an exposure window, two film guides past which film may be threaded to and from said window, sprocket means movable toward and from said guides at acute angles thereto and thereby adapted, when moved toward the guides, to engage and move the film to form loops therein between said guides and said window.

3. In motion picture apparatus, an exposure window, a bowed film guide at a distance from said window, a sprocket movable toward and from said guide at an angle thereto and fitting within the bowed guide, and thereby adapted when moved toward the guide to engage a strip of film threaded past said guide and window and move said film to form a loop therein between said guide and window.

4. In motion picture apparatus, a fixed, bowed film guide, an exposure window, separated therefrom, a sprocket movable toward and from said guide and adapted when moved toward said guide to engage a film threaded past said guide and window and to move said film to form a loop therein between the window and guide, the film being held against the sprocket by the bowed guide.

5. In motion picture apparatus, an exposure window, two fixed, bowed film guides positioned so that a band of film may be led past one guide to the window and then past the other guide, film advancing sprocket means movable toward and from said guides and adapted, when moved toward said guides to engage and move the film to form loops therein between the guides and said window.

6. In motion picture apparatus, a movable support, a film advancing sprocket on said support, an exposure window, two film guides, the support being movable to two positions, at one of which the sprocket fits within said guides, and is adapted to engage and feed film past said guides to and from said window, and at the other of which the sprocket is spaced from said guides to permit the removal and insertion of film.

7. In motion picture apparatus, an exposure window, a film guide at a distance from the window, a sprocket movable toward and from said guide and adapted when moved toward said guide to engage a film threaded past said window and guide and to move said film to form a loop therein between the window and guide, the movement of the sprocket being toward and from said window whereby when the sprocket is moved toward the guides it will engage and move the film to form slack loops therein between the guides and the window.

8. In motion picture apparatus, a film advancing sprocket, a film reel support, a mechanical power transmitting connection between said sprocket and said support, the sprocket being movable and having two positions at one of which the connection is operative and at the other of which it is inoperative.

9. In motion picture apparatus, a film advancing sprocket, a film reel support, pulleys connected to said sprocket and to said support, a frictional driving belt passing over said pulleys, the sprocket being bodily movable and having two positions at one of which said driving belt is tensioned to transmit power between said pulleys and at the other of which the belt is slack.

10. In motion picture apparatus, a film guide, a film advancing sprocket, a film reel support, a power transmitting connection between said sprocket and said support, the sprocket being bodily movable and having two positions at one of which it is close to the guide whereby film is held in driving engagement therewith by the guide and at which the connection is operative and at the other of which it is spaced from the guide and the mechanical connection is inoperative.

11. In motion picture apparatus, a film guide, a film advancing sprocket, a film reel support, pulleys associated with said sprocket and support and a friction drive belt passing over said pulleys, the sprocket being bodily movable and having two positions at one of which it is close to the guide whereby film is held in driving position there against by said guide and at which the pulleys are separated to exert tension on the belt, and at the other of which the sprocket is spaced from the guide and the pulleys are closer together whereby the tension on the belt is relieved.

12. In motion picture apparatus, two film guides, a movable support, sprocket means on said support, a film reel support, a power transmitting connection between said supports, the movable support having two positions at one of which the guides and sprocket means are close together and the mechanical connection is operative and at the other of which the guides and sprocket means are spaced and the mechanical connections are inoperative.

13. In motion picture apparatus, two film guides, a movable support, a sprocket on said support, a film reel support, a transmitting connection between said sprocket and said reel support, said movable support having two positions at one of which the sprocket lies between and close to both guides and the mechanical connection is operative and at the other of which the sprocket is spaced from the guides and the connection is inoperative.

14. In motion picture apparatus, a film advancing sprocket, a driven shaft, a power transmitting connection between said shaft and said sprocket, the sprocket being movable and having two positions at one of which the connection is operative and at the other of which it is inoperative.

15. In motion picture apparatus, a film guide, a film advancing sprocket, a driven shaft, a power transmitting connection between said shaft and said sprocket, said sprocket being bodily movable and having two positions at one of which it is close to the guide and the connection is operative and at the other of which it is spaced from the guide and the connection is inoperative.

16. In motion picture apparatus, a film guide, a movable support, a film advancing sprocket on the support, a gear carried by the support and connected with the sprocket, a driven shaft and a gear driven thereby, the support having two positions at one of which the sprocket is close to the guide and the gears intermesh and at the other of which the sprocket is spaced from the guide and the gears are separated.

17. In motion picture apparatus, two film guides, a movable support, a film advancing sprocket on the support, a gear carried by the support and connected with the sprocket, a driven shaft, and a gear driven thereby, the support having two positions at one of which the sprocket is positioned between and close to both guides and the gears intermesh and at the other of which the sprocket is spaced from the guides and the gears are separated.

18. In motion picture apparatus, a film advancing sprocket, a driven shaft, a power transmitting connection between said shaft and said sprocket whereby said sprocket is turned, a support for a reel, a power transmitting connection between said sprocket and said support whereby a reel on said support may be turned to wind up film advanced from said sprocket, said sprocket being movable and having two positions, in one of which both of said connections are operative and in the other of which both of said mechanical connections are inoperative.

19. In motion picture apparatus, a film advancing sprocket, a driven shaft, a film reel support, a movable support for said sprocket having two positions, power transmitting connections between said sprocket and said driven shaft and between said sprocket and said reel support, both of said connections being operative when the sprocket support is in one position and both of said connections being inoperative when the sprocket support is in the other position.

20. In motion picture apparatus, a film guide, a film engaging sprocket, a driven shaft, a film reel support, power transmitting connections between said sprocket and said shaft and between said sprocket and said support, said sprocket being bodily movable and having two positions at one of which it is close to the guide and both connections are operative and at the other of which it is spaced from the guide and both connections are inoperative.

21. In motion picture apparatus, a film guide, a movable support, a sprocket on said support, a film reel support, a driven shaft, power transmitting connections between said shaft and said reel support including elements on the movable support, said movable support having two positions at one of which the sprocket is close to the guide and the connections are operative, and at the other of which the sprocket is spaced from the guide and the connections are inoperative.

22. In motion picture apparatus, two film guides, a movable support, a film advancing sprocket on said movable support, two film reel supports between which film may be moved past said guides, a driven shaft, mechanical power transmitting connections between said shaft and said sprocket, drive pulleys associated with said sprocket and said reel supports and friction belts passing over said pulleys, the movable support having two positions in one of which the film is held in driving position there against by said guides, the power transmitting connections are operative and the belts are under sufficient tension to transmit power between said pulleys and at the other of which the sprocket is spaced from the guides, the power transmitting connections are inoperative and the belts are under insufficient tension to transmit power.

23. In motion picture apparatus, an exposure window, two film guides, two film reel supports, between which film from reels thereon may be formed into a loop passing said guides and window, a driven shaft, a movable support, a film advancing sprocket on said movable support, mechanical power transmitting connections between said shaft and said sprocket, drive pulleys associated with said reel supports and said sprocket and friction belts passing over said pulleys to transmit power from the sprocket to the reel supports, the movable support having two positions in one of which the film is held in driving position there against by said guides, the power transmitting connections are operative and the belts are under sufficient tension to transmit power and at the other of which the sprocket is spaced from the guides, the power transmitting connections are inoperative and the belts are under insufficient tension to transmit power, the sprocket, in its motion toward the guides engaging and moving the film to form loops between the guides and the window.

24. In motion picture apparatus, a film guide, a film engaging sprocket, two shafts for film reels, power transmitting connections between said sprocket and each of said shafts and containing one way clutches, operative in different senses, whereby one shaft will be driven when the sprocket is turned in one direction and the other shaft will be driven when the sprocket is turned in the other direction, said sprocket being movable and having two positions in one of which it is close to the guide and both connections are operative and in the other of which it is spaced from the guide and both connections are inoperative.

Signed at Rochester, New York, this 16th day of February, 1925.

EDWIN C. FRITTS.